US012801002B2

(12) United States Patent
Kano et al.

(10) Patent No.: US 12,801,002 B2
(45) Date of Patent: Nov. 17, 2026

(54) PHOSPHOR, WAVELENGTH CONVERSION DEVICE, ILLUMINATION DEVICE, AND PROJECTOR

(71) Applicant: SEIKO EPSON CORPORATION, Tokyo (JP)

(72) Inventors: Kengo Kano, Matsumoto (JP); Soma Toda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 245 days.

(21) Appl. No.: 18/604,122

(22) Filed: Mar. 13, 2024

(65) Prior Publication Data

US 2024/0310705 A1 Sep. 19, 2024

(30) Foreign Application Priority Data

Mar. 15, 2023 (JP) ................................ 2023-041076

(51) Int. Cl.
*G03B 21/20* (2006.01)
*C09K 11/77* (2006.01)

(52) U.S. Cl.
CPC ........ *G03B 21/204* (2013.01); *C09K 11/7774* (2013.01); *G03B 21/2066* (2013.01); *G03B 21/208* (2013.01)

(58) Field of Classification Search
CPC .. H04N 9/3111; H04N 9/3114; H04N 9/3117; H04N 9/3141; G03B 21/145; G03B 21/204; G03B 21/208; G03B 21/2013; G03B 21/2033; G03B 21/2053; G03B 21/2066; C09K 11/08; C09K 11/0838; C09K 11/0855; C09K 11/617; C09K 11/62; C09K 11/655; C09K 11/666; C09K 11/7774
See application file for complete search history.

(56) References Cited

U.S. PATENT DOCUMENTS

| | | | | |
|---|---|---|---|---|
| 2011/0210658 A1* | 9/2011 | Pan | B32B 18/00 | 252/301.4 R |
| 2012/0045634 A1* | 2/2012 | Irie | C09K 11/7774 | 428/220 |
| 2019/0075276 A1* | 3/2019 | Hashizume | H04N 9/3158 | |
| 2020/0347290 A1* | 11/2020 | Nakamura | C09K 11/0883 | |
| 2020/0392401 A1* | 12/2020 | Ito | C09K 11/02 | |
| 2021/0286245 A1* | 9/2021 | Yasumatsu | G02B 27/102 | |

(Continued)

FOREIGN PATENT DOCUMENTS

JP 2012062459 A 3/2012

OTHER PUBLICATIONS

U.S. Office Action for corresponding U.S. Appl. No. 18/605,278, dated Feb. 24, 2026, 13 pages.

*Primary Examiner* — Sultan Chowdhury
(74) *Attorney, Agent, or Firm* — Dority & Manning, P.A.

(57) ABSTRACT

A phosphor includes a phosphor phase made of $A_3B_5O_{12}$:Ce having a garnet structure; and a matrix phase having a refractive index higher than a refractive index of the phosphor phase. A content of the phosphor phase is 56 vol % or more and 70 vol % or less in terms of a volume ratio with respect to a total including the matrix phase and the phosphor phase. A is at least one selected from the group consisting of Lu, Gd, Tb, Ga, and Y. B is Al.

13 Claims, 4 Drawing Sheets

(56) References Cited

U.S. PATENT DOCUMENTS

| | | | |
|---|---|---|---|
| 2022/0026788 | A1 | 1/2022 | Akiyama |
| 2022/0236631 | A1* | 7/2022 | Kito .................... G03B 21/2033 |
| 2022/0384681 | A1* | 12/2022 | Matsukura ........... H10H 20/825 |
| 2023/0069926 | A1 | 3/2023 | Chiou |
| 2023/0229068 | A1 | 7/2023 | Hikmet et al. |
| 2025/0084308 | A1 | 3/2025 | Li et al. |

* cited by examiner

PHOSPHOR, WAVELENGTH CONVERSION DEVICE, ILLUMINATION DEVICE, AND PROJECTOR

The present application is based on, and claims priority from JP Application Serial Number 2023-041076, filed Mar. 15, 2023, the disclosure of which is hereby incorporated by reference herein in its entirety.

BACKGROUND

1. Technical Field

The present disclosure relates to a phosphor, a wavelength conversion device, an illumination device, and a projector.

2. Related Art

In the related art, a ceramic composite is used as a wavelength conversion member used in a light source for a projector. JP-A-2012-062459 below discloses a ceramic composite formed of an inorganic material having a matrix phase made of a transparent ceramic such as $Al_2O_3$, $MgAl_2O_4$, or MgO, and a phosphor phase made of YAG containing Ce.

JP-A-2012-062459 is an example of the related art.

However, in the ceramic composite disclosed in JP-A-2012-062459, although thermal conductivity is improved by mixing and firing a highly thermally conductive filler, it is difficult to sufficiently e fluorescence extraction efficiency.

SUMMARY

According to an aspect of the present disclosure, there is provided a phosphor including: a phosphor phase made of $A_3B_5O_{12}$:Ce having a garnet structure; and a matrix phase having a refractive index higher than a refractive index of the phosphor phase. A content of the phosphor phase is 56 vol % or more and 70 vol % or less in terms of a volume ratio with respect to a total including the matrix phase and the phosphor phase. A is at least one selected from the group consisting of Lu, Gd, Tb, Ga, and Y, and B is Al.

According to another aspect of the present disclosure, there is provided a wavelength conversion device including: a substrate; the phosphor according to the above aspect, provided on the substrate and configured to convert an incident excitation light into fluorescence; and a reflective layer provided at an opposite side of a light incident side of the phosphor from and configured to reflect the excitation light and the fluorescence.

According to still another aspect of the present disclosure, there is provided a wavelength conversion device including: a substrate; the phosphor according to the above aspect, provided on the substrate and configured to convert an incident excitation light into fluorescence; and an optical layer provided on a light incident side of the phosphor, and configured to transmit the excitation light and reflect the fluorescence.

According to another aspect of the present disclosure, there is provided an illumination device including: a light source configured to emit an excitation light; and the wavelength conversion device according to the above aspect on which the excitation light is incident.

According to yet another aspect of the present disclosure, there is provided a projector including: the illumination device according to the above aspect; a light modulation device configured to modulate a light emitted from the illumination device; and a projection optical device configured to project the light modulated by the light modulation device.

DESCRIPTION OF EMBODIMENTS

Figure 1:
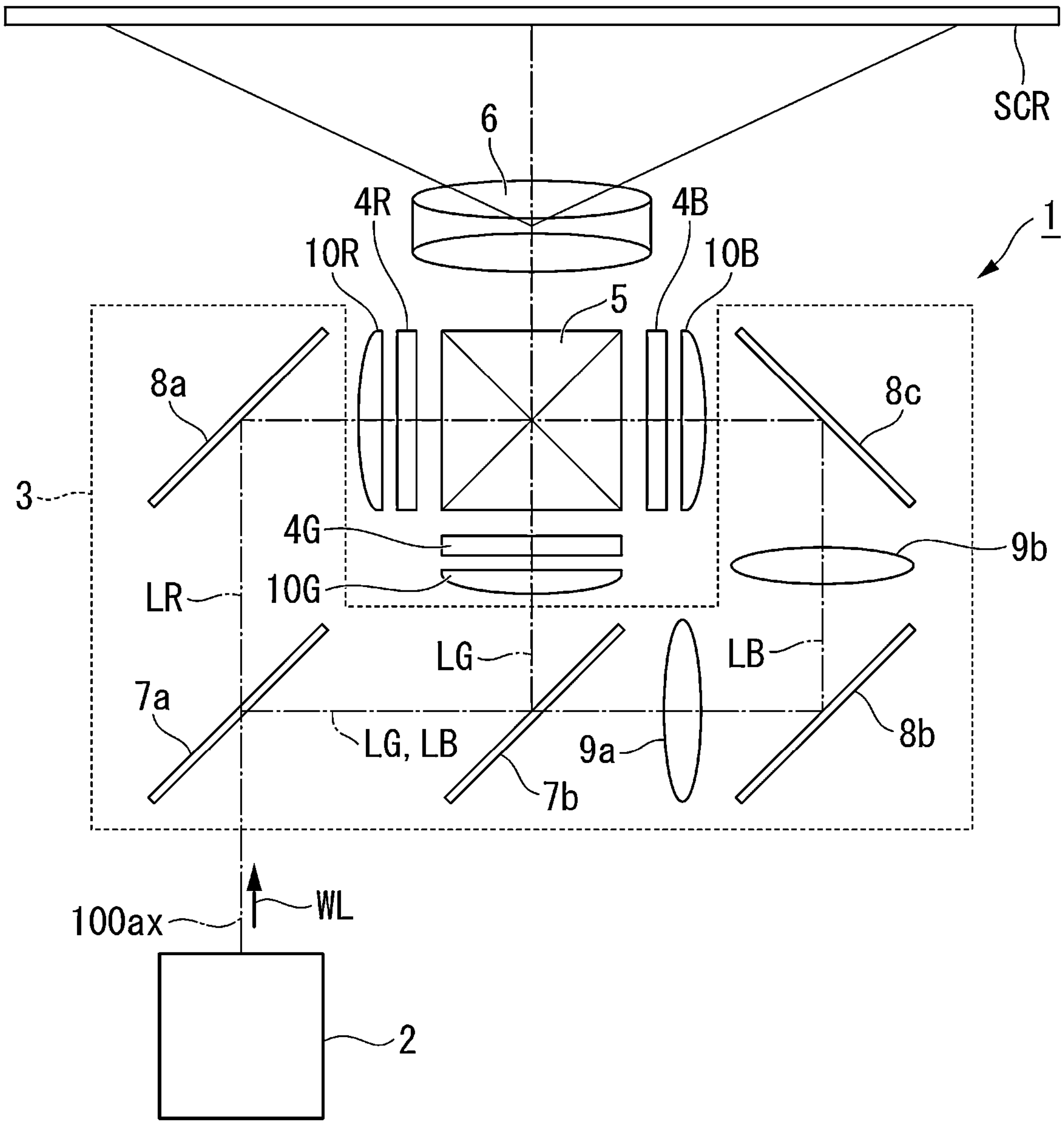
FIG. 1 is a schematic configuration diagram showing a projector according to a first embodiment.

Hereinafter, an embodiment of the present disclosure will be described in detail with reference to the drawings. In the drawings used in the following description, in order to facilitate understanding of features, a feature portion may be shown in an enlarged manner for convenience, and a dimensional ratio or the like of each component is not necessarily the same as an actual dimensional ratio.

First Embodiment

Hereinafter, an embodiment of the present disclosure will be described.

FIG. 1 is a schematic configuration diagram showing a projector according to a first embodiment.

As shown in FIG. 1, a projector 1 according to the embodiment is a projection-type image display device that displays an image on a screen SCR. The projector 1 includes an illumination device 2, a color separation optical system 3, a light modulation device 4R, a light modulation device 4G, a light modulation device 4B, a synthesis optical system 5, and a projection optical device 6.

The illumination device 2 emits a white illumination light WL toward the color separation optical system 3. A configuration of the illumination device 2 will be described in detail later.

The color separation optical system 3 separates the illumination light WL emitted from the illumination device 2 into a red light LR, a green light LG, and a blue light LB. The color separation optical system 3 includes a first dichroic mirror 7*a*, a second dichroic mirror 7*b*, a first total reflection mirror 8*a*, a second total reflection mirror 8*b*, a third total reflection mirror 8*c*, a first relay lens 9*a*, and a second relay lens 9*b*.

The first dichroic mirror 7*a* separates the illumination light WL from the illumination device 2 into the red light LR and a light including the green light LG and the blue light LB. The first dichroic mirror 7*a* transmits the red light LR and reflects the light including the green light LG and the blue light LB. On the other hand, the second dichroic mirror 7*b* reflects the green light LG and transmits the blue light LB. Accordingly, the second dichroic mirror 7*b* separates the light including the green light LG and the blue light LB into the green light LG and the blue light LB.

The first total reflection mirror 8*a* is disposed in an optical path of the red light LR, and reflects the red light LR transmitted through the first dichroic mirror 7*a* toward the light modulation device 4R. On the other hand, the second total reflection mirror 8*b* and the third total reflection mirror 8*c* are disposed in an optical path of the blue light LB, and guide the blue light LB transmitted through the second dichroic mirror 7*b* to the light modulation device 4B. The green light LG is reflected from the second dichroic mirror 7*b* toward the light modulation device 4G.

The first relay lens 9*a* is disposed between the second dichroic mirror 7*b* and the second total reflection mirror 8*b* in the optical path of the blue light LB. The second relay lens 9*b* is disposed between the second total reflection mirror 8*b* and the third total reflection mirror 8*c* in the optical path of the blue light LB. The first relay lens 9*a* and the second relay lens 9*b* compensate for an optical loss of the blue light LB due to an optical path length of the blue light LB being longer than an optical path length of the red light LR or the green light LG.

The light modulation device 4R modulates the red light LR according to image information to form an image light corresponding to the red light LR. The light modulation device 4G modulates the green light LG according to image information to form an image light corresponding to the green light LG. The light modulation device 4B modulates the blue light LB according to image information to form an image light corresponding to the blue light LB.

For example, a transmissive liquid crystal panel is used for each of the light modulation device 4R, the light modulation device 4G, and the light modulation device 4B. A polarizing plate (not shown) is disposed at each of an incident side and an emission side of the liquid crystal panel.

A field lens 10R is disposed at an incident side of the light modulation device 4R. The field lens 10R collimates the red light LR incident on the light modulation device 4R. A field lens 10G is disposed at an incident side of the light modulation device 4G. The field lens 10G collimates the green light LG incident on the light modulation device 4G. A field lens 10B is disposed at an incident side of the light modulation device 4B. The field lens 10B collimates the blue light LB incident on the light modulation device 4B.

The image lights emitted from the light modulation device 4R, the light modulation device 4G, and the light modulation device 4B are incident on the synthesis optical system 5. The synthesis optical system 5 synthesizes the image lights corresponding to the red light LR, the green light LG, and the blue light LB, and emits the synthesized image light toward the projection optical device 6. For example, a cross dichroic prism is used for the synthesis optical system 5.

The projection optical device 6 includes a plurality of projection lenses. The projection optical device 6 enlarges and projects the image light synthesized by the synthesis optical system 5 toward the screen SCR. Accordingly, an enlarged image is displayed on the screen SCR.

Hereinafter, a configuration of the illumination device 2 will be described.

Figure 2:
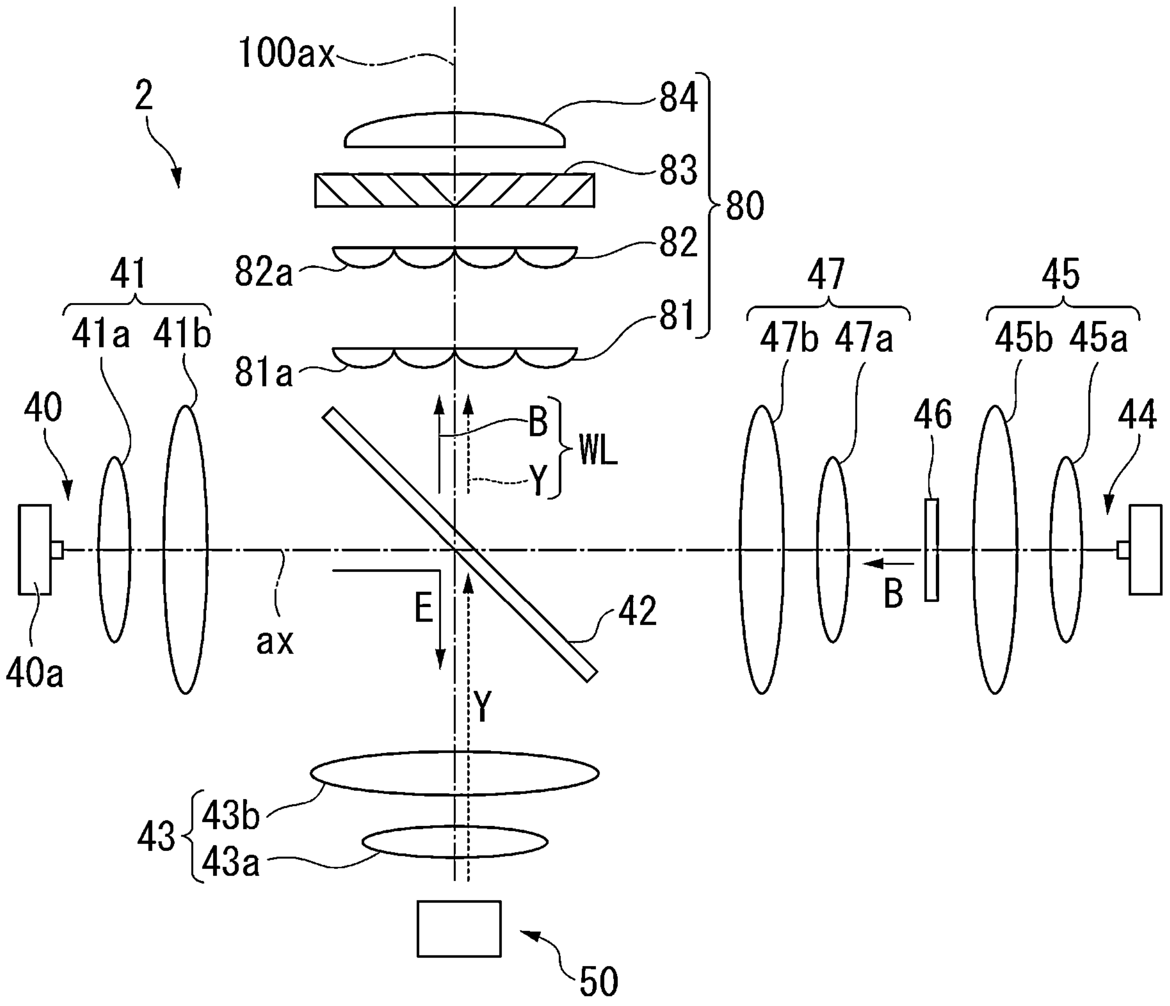
FIG. 2 is a schematic configuration diagram showing an illumination device according to the first embodiment.

FIG. 2 is a schematic configuration diagram showing the illumination device 2 according to the embodiment.

As shown in FIG. 2, the illumination device 2 includes a first light source 40, a collimating optical system 41, a dichroic mirror 42, a first condensing optical system 43, a wavelength conversion device 50, a second light source 44, a second condensing optical system 45, a diffuser 46, and a collimating optical system 47.

The first light source 40 includes a plurality of semiconductor lasers 40*a* that emit a blue excitation light E made of a laser light. A peak of an emission intensity of the excitation light E is, for example, 445 nm. The plurality of semiconductor lasers 40*a* are disposed in an array in one plane orthogonal to an optical axis ax of the first light source 40.

The semiconductor laser 40*a* may be a semiconductor laser that emits a blue light having a wavelength other than 445 nm, for example, 455 nm or 460 nm. The optical axis ax of the first light source 40 is orthogonal to an illumination optical axis 100*ax* of the illumination device 2.

The first light source 40 according to the embodiment corresponds to a "light source" in the claims.

The collimating optical system 41 includes a first lens 41*a* and a second lens 41*b*. The collimating optical system 41 substantially collimates the light emitted from the first light source 40. Each of the first lens 41*a* and the second lens 41*b* is implemented by a convex lens.

The dichroic mirror 42 is disposed in an optical path from the collimating optical system 41 to the first condensing optical system 43 in a direction intersecting each of the optical axis ax of the first light source 40 and the illumination optical axis 100*ax* at an angle of 45°. The dichroic mirror 42 reflects a blue light component and transmits a red light component and a green light component. Therefore, the dichroic mirror 42 reflects the excitation light E and the blue light B and transmits yellow fluorescence Y.

The first condensing optical system 43 condenses the excitation light E transmitted through the dichroic mirror 42 and causes the excitation light E to enter the wavelength conversion device 50, and substantially collimates the fluorescence Y emitted from the wavelength conversion device 50. The first condensing optical system 43 includes a first lens 43*a* and a second lens 43*b*. Each of the first lens 43*a* and the second lens 43*b* is a implemented by convex lens.

The second light source 44 is implemented by a semiconductor laser having a wavelength band same as a wavelength band of the first light source 40. The second light source 44 may be implemented by one semiconductor laser, or may be implemented by a plurality of semiconductor lasers. In addition, the second light source 44 may be implemented by a semiconductor laser having a wavelength band different from that of the semiconductor laser of the first light source 40.

The second condensing optical system 45 includes a first lens 45*a* and a second lens 45*b*. The second condensing optical system 45 condenses the blue light B emitted from the second light source 44 on a diffusion surface of the diffuser 46 or near the diffusion surface. Each of the first lens 45*a* and the second lens 45*b* is implemented by a convex lens.

The diffuser 46 diffuses the blue light B emitted from the second light source 44, and generates the blue light B having a light distribution close to a light distribution of the fluorescence Y emitted from the wavelength conversion device 50. As the diffuser 46, for example, a polished glass made of an optical glass can be used.

The collimating optical system 47 includes a first lens 47*a* and a second lens 47*b*. The collimating optical system 47 substantially collimates the light emitted from the diffuser 46. Each of the first lens 47*a* and the second lens 47*b* is implemented by a convex lens.

The blue light B emitted from the second light source 44 is reflected by the dichroic mirror 42, and is synthesized with the fluorescence Y emitted from the wavelength conversion device 50 and transmitted through the dichroic mirror 42 to generate the white illumination light WL. The illumination light WL is incident on a uniform illumination optical system 80.

The uniform illumination optical system 80 includes a first lens array 81, a second lens array 82, a polarization conversion element 83, and a superimposing lens 84.

The first lens array 81 includes a plurality of first lenses 81*a* for dividing the illumination light WL from the illumination device 2 into a plurality of partial light beams. The plurality of first lenses 81*a* are arranged in a matrix in a plane orthogonal to the illumination optical axis 100*ax*.

The second lens array 82 includes a plurality of second lenses 82*a* corresponding to the plurality of first lenses 81*a* of the first lens array 81. The plurality of second lenses 82*a* are arranged in a matrix in the plane orthogonal to the illumination optical axis 100*ax*.

The second lens array 82, together with the superimposing lens 84, forms images of the first lenses 81*a* of the first lens array 81 in the vicinity of image forming regions of the light modulation device 4R, the light modulation device 4G, and the light modulation device 4B.

The polarization conversion element 83 converts the light emitted from the second lens array 82 into one linearly polarized light. The polarization conversion element 83 includes, for example, a polarization separation film and a retardation plate (not shown).

The superimposing lens 84 condenses each partial light beam emitted from the polarization conversion element 83 and superimposes the condensed light beams in the vicinity of the image forming regions of the light modulation device 4R, the light modulation device 4G, and the light modulation device 4B.

Next, a configuration of the wavelength conversion device 50 will be described.

Figure 3:
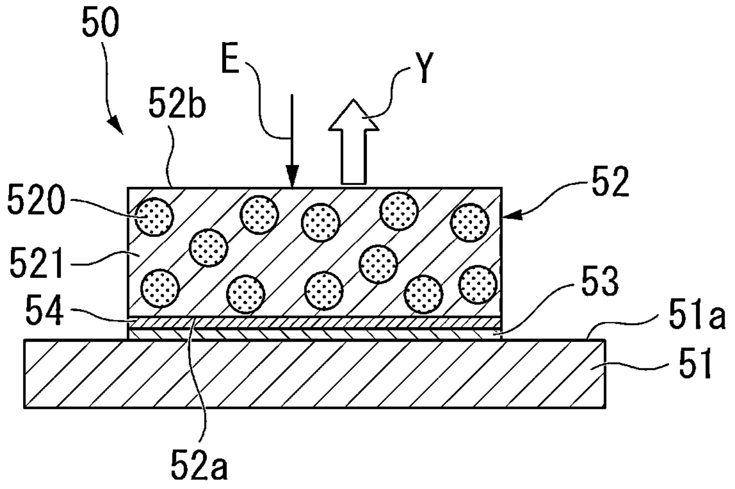
FIG. 3 is a cross-sectional view showing a configuration of a wavelength conversion device.

FIG. 3 is a cross-sectional view showing the configuration of the wavelength conversion device 50. FIG. 3 corresponds to a cross section of the wavelength conversion device 50 taken along a plane including the illumination optical axis 100*ax* in FIG. 2.

As shown in FIG. 3, the wavelength conversion device 50 includes a substrate 51, a phosphor 52, a bonding layer 53, and a reflective layer 54. The wavelength conversion device 50 according to the embodiment is a fixed type wavelength conversion device in which an incident position of the excitation light E on the phosphor 52 does not change over time.

The substrate 51 supports the reflective layer 54 and the phosphor 52 through the bonding layer 53. The substrate 51 is made of, for example, a metal material having a high thermal conductivity, such as aluminum or copper. The bonding layer 53 is made of, for example, a bonding material having a high thermal conductivity, such as a nanosilver paste. The bonding layer 53 bonds a first surface 51*a*, which is a surface of the substrate 51, and the phosphor 52.

The phosphor 52 has a first surface 52*a* facing the substrate 51 and a second surface 52*b* at an opposite side from the first surface 52*a*. The phosphor 52 emits, from the second surface 52*b*, the fluorescence Y obtained by wavelength-converting the excitation light E incident from the second surface 52*b*. The phosphor 52 includes a phosphor phase 520 and a matrix phase 521.

The reflective layer 54 is provided to face the first surface 51*a* of the substrate 51 with the bonding layer 53 interposed therebetween. That is, the reflective layer 54 is provided between the substrate 51 and the first surface 52*a* of the phosphor 52. The reflective layer 54 is formed of a metal film such as silver having a high optical reflectance, a dielectric multilayer film, or a combination of these films. The reflective layer 54 reflects the fluorescence Y directed toward an opposite side of a light incident side of the phosphor 52 (the first surface 52*a* side) toward the light incident side (the second surface 52*b* side). The reflective layer 54 may reflect a part of the excitation light E to the light incident side (the second surface 52*b* side), and the excitation light E reflected by the reflective layer 54 is used to excite the fluorescence Y.

The wavelength conversion device 50 according to the embodiment functions as a reflective wavelength conversion device that emits the fluorescence Y from the second surface 52*b* of the phosphor 52 on which the excitation light E is incident.

Figure 4:
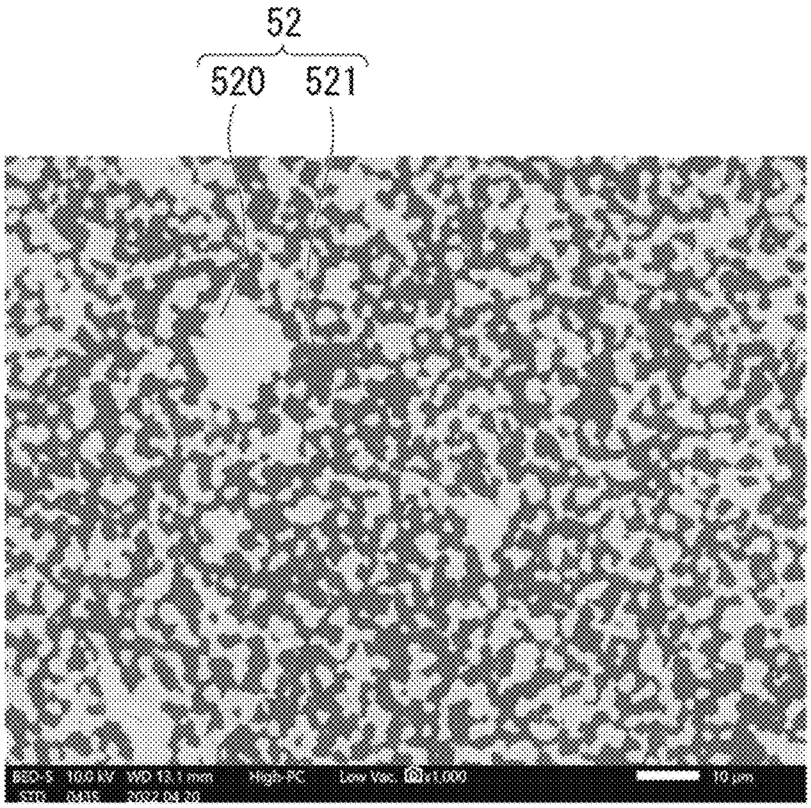
FIG. 4 is an SEM image of a phosphor.

FIG. 4 is a diagram showing a main part configuration of the phosphor 52 according to the embodiment. FIG. 4 is an image obtained by imaging the phosphor 52 using a scanning electron microscope (SEM).

The phosphor phase 520 shown in FIG. 4 contains phosphor particles made of $A_3B_5O_{12}$:Ce having a garnet structure. In the phosphor phase 520 according to the embodiment, A is Y (yttrium) and B is AL (aluminum). That is, the phosphor phase 520 according to the embodiment contains phosphor particles made of yttrium aluminum garnet (YAG ($Y_3Al_5O_{12}$):Ce) to which cerium (Ce) is added as an activator.

The matrix phase 521 is a transparent ceramic that functions as a binder for binding a plurality of phosphor particles forming the phosphor phase 520 and that allows fluorescence emitted by the phosphor phase 520 to pass therethrough. The matrix phase 521 according to the embodiment is made of aluminum nitride (AlN). The matrix phase 521 has a refractive index (2.2) higher than a refractive index of YAG:Ce (1.8) forming the phosphor phase 520.

A thermal conductivity of AlN forming the matrix phase 521 is about 285 W/m·K, and a thermal conductivity of YAG:Ce forming the phosphor phase 520 is about 9 W/m·K. That is, the matrix phase 521 has a thermal conductivity sufficiently higher than the thermal conductivity of the phosphor phase 520.

The thermal conductivity of the matrix phase 521 according to the embodiment is sufficiently higher than the thermal conductivity of $Al_2O_3$ (alumina) (about 30 W/m·K), which is generally used as the matrix phase of a ceramic phosphor. Therefore, the phosphor 52 according to the embodiment has excellent thermal conductivity and excellent heat dissipation as compared with a phosphor in the related art that uses $Al_2O_3$ as the matrix phase.

A thickness of the phosphor 52 according to the embodiment in a light emission direction is preferably 30 μm or more and 200 μm or less. This is because when the thickness is less than 30 μm, cracking or the like occurs during production because the thickness is too small. In addition, when the thickness is more than 200 μm, the thickness is too large, and thus the heat dissipation of the phosphor 52 decreases and fluorescence conversion efficiency decreases.

In the embodiment, the thickness of the phosphor 52 is 200 μm.

In general, it is known that, when a temperature of the phosphor increases, an emission spectrum of fluorescence shifts to a long wavelength side and emission efficiency decreases. One of the reasons is that the emission spectrum shifts to the long wavelength side, and thus energy to be used when the excitation light is subjected to fluorescence conversion is increased. That is, in order to enhance the fluorescence conversion efficiency in the phosphor, it is effective to reduce the shift of the emission spectrum to the long wavelength side due to a temperature rise.

In the present disclosure, attention is paid to enhancing the fluorescence conversion efficiency of the phosphor by reducing the shift of the emission spectrum to the long wavelength side due to the temperature rise. Further, in the present disclosure, it is found that it is possible to implement a phosphor in which a decrease in the fluorescence conversion efficiency due to the temperature rise is prevented by reducing, to 20 nm or less, a shift amount of the emission spectrum to the long wavelength side due to the temperature rise.

In the present disclosure, as a result of intensive studies, the configuration of the phosphor 52 according to the embodiment is completed.

First, in the present disclosure, it is considered that when a content of Ce in the phosphor phase is too small, the excitation light is not favorably absorbed in the phosphor phase, and an amount of extracted fluorescence decreases. That is, it is considered that by appropriately setting the content of Ce in the phosphor phase, a decrease in quantum yield of fluorescence is prevented, and the amount of extracted fluorescence is increased. The quantum yield of the fluorescence Y means a ratio of the number of photons of the fluorescence Y emitted by excitation with the excitation light E to the number of photons of the excitation light E. More specifically, the quantum yield is a value obtained by dividing the amount of the fluorescence Y emitted by the phosphor 52 by an amount of the excitation light E absorbed.

The phosphor 52 according to the embodiment includes the phosphor phase 520 made of YAG ($Y_3Al_5O_{12}$):Ce having a garnet structure, and the matrix phase 521 having a refractive index higher than a refractive index of the phosphor phase 520. A content of the phosphor phase 520 is 56 vol % or more and 70 vol % or less in terms of a volume ratio in an entire phase including the matrix phase 521 and the phosphor phase 520. Hereinafter, in the present specification, a volume ratio of the phosphor phase 520 to the entire phase including the matrix phase 521 and the phosphor phase 520 is referred to as a "YAG amount".

According to the phosphor 52 in the embodiment, by setting the YAG amount to 56 vol % or more and 70 vol % or less, the excitation light E is favorably absorbed in the phosphor phase 520.

In addition, in the present disclosure, it is considered that, when an average particle diameter of the phosphor phase is too small, the excitation light is less likely to be absorbed by the phosphor phase, so that a fluorescence emission amount decreases and the quantum yield decreases.

In contrast, in the phosphor 52 according to the embodiment, as shown in FIG. 4, the average particle diameter of the phosphor phase 520 is set to 3 μm or more. The average particle diameter is defined, for example, as an average of lengths of images in a long axis direction, which are obtained by observing a cross section of 1.0 $mm^2$ according to a microscopic method.

According to the phosphor 52 in the embodiment, by setting the average particle diameter of the phosphor phase 520 to 3 μm or more, the excitation light E is favorably absorbed in the phosphor phase 520, and emission efficiency of fluorescence can be enhanced.

Therefore, the phosphor 52 according to the embodiment can implement a quantum yield of 85% or more, and can generate the bright fluorescence Y by enhancing the emission efficiency of the fluorescence Y. The quantum yield of 85% or more means that the fluorescence Y emitted from the phosphor 52 is practically used as an illumination light for a projector without any problem.

In the phosphor 52 according to the embodiment, when the YAG amount is 56 vol % or more and 70 vol % or less, a ratio of the matrix phase 521 is determined in a predetermined range (33 vol % or more and 44 vol % or less). In the phosphor 52 according to the embodiment, the matrix phase 521 is made of AlN having a high thermal conductivity. Therefore, the phosphor 52 according to the embodiment can prevent a decrease in fluorescence conversion efficiency due to a temperature rise by efficiently releasing heat accompanying fluorescence emission. That is, since the phosphor 52 according to the embodiment includes the matrix phase 521 having a high thermal conductivity, the temperature rise is prevented as described later, and the shift of the emission spectrum of the fluorescence Y to the long wavelength side can be prevented.

More specifically, in the phosphor 52 according to the embodiment, the thermal conductivity of the entire element can be 20 (W/m·K)) or more. Therefore, by efficiently releasing the heat accompanying the fluorescence emission, it is possible to favorably prevent a decrease in fluorescence conversion efficiency due to a temperature rise.

In general, when the content of Ce in the phosphor phase is excessively large in the phosphor, there is a concern that the fluorescence generated in the phosphor phase is scattered toward the inside due to a refractive index difference between the phosphor phase and the matrix phase, and is thereby re-absorbed by Ce, thereby decreasing the quantum yield of the fluorescence. In particular, in the phosphor 52 according to the embodiment, the heat dissipation is enhanced by using AlN as the matrix phase 521 as described above. AlN has a refractive index higher than a refractive index of alumina (1.63), which is generally used as the matrix phase. That is, in the phosphor 52 according to the embodiment, the refractive index difference between the phosphor phase 520 and the matrix phase 521 is large, and there is a concern that Ce reabsorption occurs.

In contrast, in the phosphor 52 according to the embodiment, by setting the YAG amount to 56 vol % or more and 70 vol % or less as described above, it is possible to efficiently extract the fluorescence Y by taking a balance between improvement in the heat dissipation of the heat accompanying the fluorescence emission and prevention of the reabsorption of the fluorescence Y due to the refractive index difference.

Figure 5:
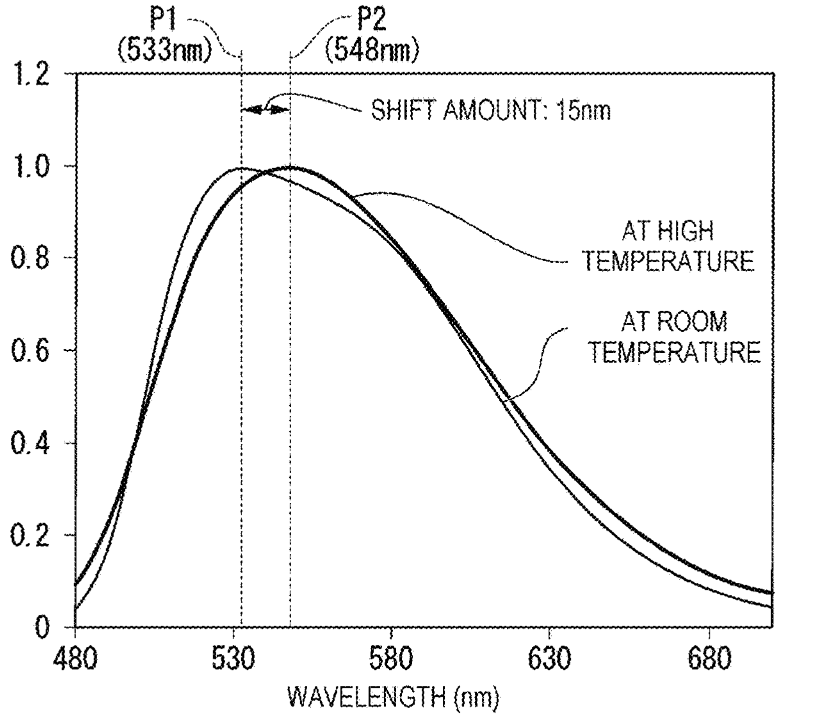
FIG. 5 is a diagram showing an emission spectrum of the phosphor.

FIG. 5 is a diagram showing an emission spectrum of the phosphor 52 according to the embodiment. A solid line in FIG. 5 shows an emission spectrum of the phosphor 52 at room temperature (25° C.), and a broken line in FIG. 5 shows an emission spectrum of the phosphor 52 at a high temperature (250° C.). The temperature of 250° C. at a high temperature is the maximum temperature assumed for the phosphor 52 when used as an illumination device for a projector.

As shown in FIG. 5, in the phosphor 52 according to the embodiment, an emission peak wavelength P1 of the spectrum at room temperature is 533 nm, and an emission peak wavelength P2 of the spectrum at a high temperature is 548 nm. That is, in the case of the phosphor 52 according to the embodiment, a shift amount of the emission spectrum generated at a high temperature (250° C.) is 15 nm. That is, according to the phosphor 52 in the embodiment, the shift amount of the emission spectrum at a high temperature can be reduced to 20 nm or less.

As described above, in the phosphor 52 according to the embodiment, by setting the YAG amount to 56 vol % or more and 70 vol % or less, it is possible to reduce the shift amount of the emission spectrum due to a temperature rise to 20 nm or less by enhancing the heat dissipation. Accordingly, it is possible to generate the bright fluorescence Y by enhancing the fluorescence conversion efficiency by reducing the energy to be used during the fluorescence conversion due to the shift of the spectrum.

The wavelength conversion device 50 according to the embodiment includes the substrate 51, the phosphor 52 that is provided on the substrate 51 and converts the incident excitation light E into the fluorescence, and the reflective layer 54 that is provided at an opposite side of the light incident side of the phosphor 52.

According to the wavelength conversion device 50 in the embodiment, it is possible to provide a reflective wavelength conversion device that efficiently extracts the bright fluorescence Y.

The illumination device 2 according to the embodiment includes the first light source 40 that emits the excitation light E and the wavelength conversion device 50 on which the excitation light E is incident.

According to the illumination device 2 in the embodiment, it is possible to provide an illumination device that has excellent wavelength conversion efficiency and emits the bright illumination light WL.

The projector 1 according to the embodiment includes the illumination device 2, the light modulation devices 4R, 4G, and 4B that modulate the light emitted from the illumination device 2, and the projection optical device 6 that projects the light modulated by the light modulation devices 4R, 4G, and 4B.

According to the projector 1 in the embodiment, it is possible to provide a projector having excellent display quality and high efficiency.

Second Embodiment

Hereinafter, a projector according to a second embodiment will be described.

A basic configuration of the projector according to the second embodiment is the same as that of the first embodiment, and a configuration of the illumination device is different from that of the first embodiment. Therefore, the configuration of the illumination device will be described below.

Figure 6:
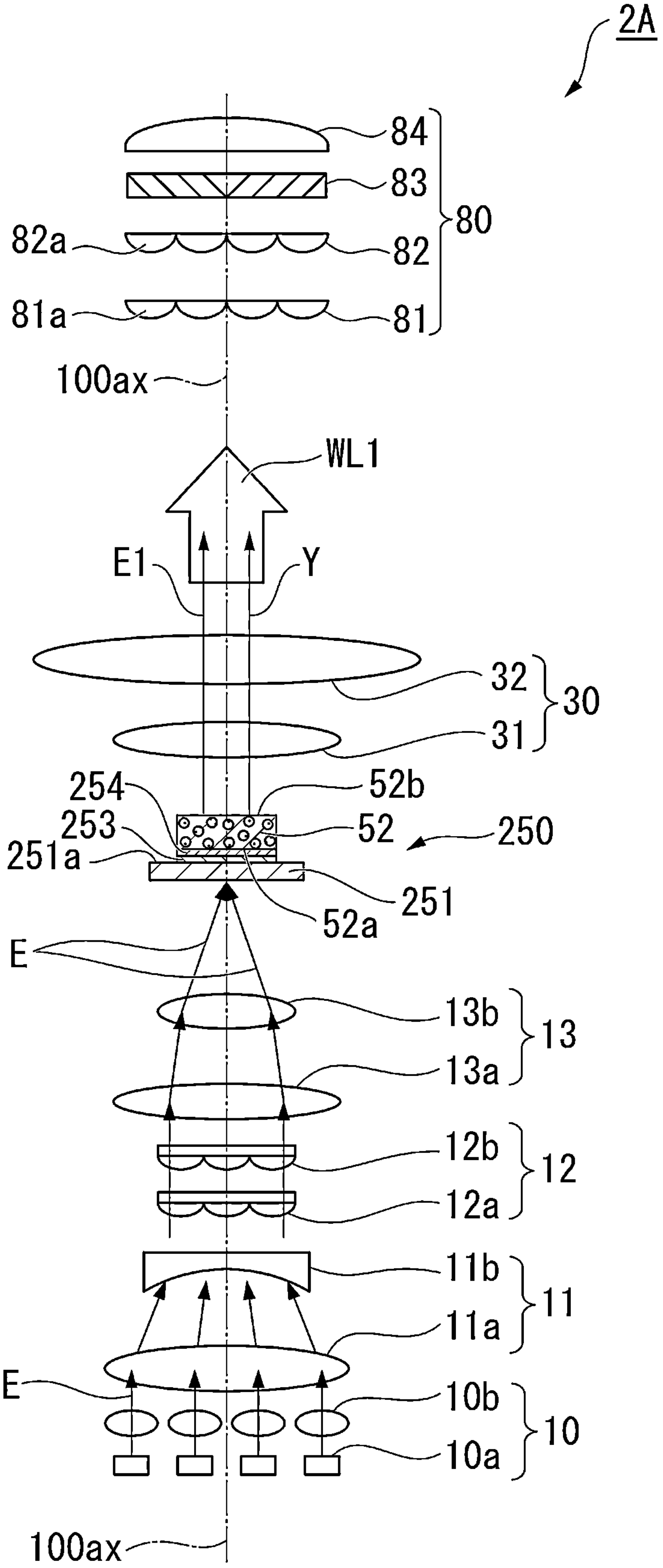
FIG. 6 is a schematic configuration diagram showing an illumination device according to a second embodiment.

FIG. 6 is a schematic configuration diagram showing an illumination device 2A according to the second embodiment.

In FIG. 6, components common to those in the drawings used in the above embodiment are denoted by the same reference numerals, and a description thereof is omitted.

As shown in FIG. 6, the illumination device 2A includes an excitation light source unit 10, an afocal optical system 11, a homogenizer optical system 12, a condensing optical system 13, a wavelength conversion device 250, a pickup optical system 30, and a uniform illumination optical system 80.

The excitation light source unit 10 includes a plurality of semiconductor lasers 10*a* that emit the blue excitation light E made of a laser light, and a plurality of collimator lenses 10*b*. The plurality of semiconductor lasers 10*a* are disposed in an array in a plane orthogonal to the illumination optical axis 100*ax*. The collimator lenses 10*b* are disposed in an array in the plane orthogonal to the illumination optical axis 100*ax* so as to correspond to the respective semiconductor lasers 10*a*. The collimator lens 10*b* converts the excitation light E emitted from the semiconductor laser 10*a* corresponding to the collimator lens 10*b* into a parallel light.

The excitation light source unit 10 according to the embodiment corresponds to a “light source” in the claims.

The afocal optical system 11 includes, for example, a convex lens 11*a* and a concave lens 11*b*. The afocal optical system 11 reduces a light beam diameter of the excitation light E including a parallel light beam emitted from the excitation light source unit 10.

The homogenizer optical system 12 includes, for example, a first multi-lens array 12*a* and a second multi-lens array 12*b*. The homogenizer optical system 12 makes a light intensity distribution of the excitation light uniform on the phosphor 52 of the wavelength conversion device 250, that is, a so-called top hat distribution. The homogenizer optical system 12, together with the condensing optical system 13, superimposes a plurality of small light beams emitted from a plurality of lenses of the first multi-lens array 12*a* and the second multi-lens array 12*b* on the phosphor 52 of the wavelength conversion device 250. Accordingly, the light intensity distribution of the excitation light E emitted to the phosphor 52 is made uniform.

The condensing optical system 13 includes, for example, a first lens 13*a* and a second lens 13*b*. In the embodiment, each of the first lens 13*a* and the second lens 13*b* is implemented by a convex lens. The condensing optical system 13 is disposed in an optical path from the homogenizer optical system 12 to the wavelength conversion device 250, condenses the excitation light E, and causes the excitation light E to enter the phosphor 52 of the wavelength conversion device 250.

The wavelength conversion device 250 according to the embodiment includes a substrate 251, the phosphor 52, a bonding layer 253, and an optical layer 254. The wavelength conversion device 250 according to the embodiment is a fixed type wavelength conversion device in which an incident position of the excitation light E on the phosphor 52 does not change over time.

The substrate 251 supports the optical layer 254 and the phosphor 52 through the bonding layer 253. The substrate 251 is made of, for example, a transparent material such as a glass or a plastic. The bonding layer 253 according to the embodiment is made of, for example, a material having optical transparency, such as epoxy. The bonding layer 253 bonds a first surface 251*a*, which is a surface of the substrate 251, and the phosphor 52.

In the phosphor 52 according to the embodiment, the excitation light E is incident from the first surface 52*a* facing the substrate 251, and the fluorescence Y is emitted from the second surface 52*b*. In the wavelength conversion device 250 according to the embodiment, the phosphor 52 transmits and emits not only the fluorescence Y but also a part of an excitation light E1 whose wavelength is not converted. Accordingly, a white illumination light WL1 is emitted from the phosphor 52.

The optical layer 254 is provided on the first surface 52*a* at the light incident side of the phosphor 52. The optical layer 254 includes a dichroic mirror that transmits the excitation light E and reflects the fluorescence Y.

The wavelength conversion device 250 according to the embodiment functions as a transmissive wavelength conversion device that emits the illumination light WL1 containing the fluorescence Y from the second surface 52*b* opposite to the first surface 52*a* of the phosphor 52 on which the excitation light E is incident.

The pickup optical system 30 includes, for example, a first collimating lens 31 and a second collimating lens 32. The pickup optical system 30 is a collimating optical system for substantially collimating the light emitted from the phosphor 52 of the wavelength conversion device 250. Each of the first collimating lens 31 and the second collimating lens 32 is implemented by a convex lens. The light collimated by the pickup optical system 30 is incident on the uniform illumination optical system 80.

Effects of Second Embodiment

According to the embodiment, by using the phosphor 52 capable of increasing an amount of extracted fluorescence Y, it is possible to implement the transmissive wavelength conversion device 250 that generates the bright fluorescence Y. In addition, in the illumination device 2A according to the embodiment, by providing the transmissive wavelength conversion device 250, it is also possible to obtain the effect same as that of the first embodiment in which the wavelength conversion efficiency is excellent and the bright illumination light WL1 can be emitted.

The technical scope of the present disclosure is not limited to the above embodiment, and various modifications can be made without departing from the gist of the present disclosure.

Specific descriptions of shapes, numbers, arrangements, materials, production methods, and the like of the respective components of the phosphor, the wavelength conversion device, the illumination device, and the projector described in the above embodiments are not limited to the above embodiments, and can be appropriately changed.

In the above embodiments, YAG containing Ce is taken as an example of the phosphor phase 520, and the present disclosure is also applicable to a case of using a phosphor phase containing Ce in at least one of $Lu_3Al_5O_{12}$, $Tb_3Al_5O_{12}$, $Ga_3Al_5O_{12}$, and $Gd_3Al_5O_{12}$. That is, since A in a garnet structure ($A_3B_5O_{12}$:Ce) can obtain emission characteristics similar to those of Y in addition to Y (yttrium), the present disclosure is also applicable to a case in which A is replaced with any of Lu (lutetium), Gd (gallium), Tb (terbium), and Ga (gallium).

Hereinafter, the present disclosure will be summarized.

Appendix 1

A phosphor including:

a phosphor phase made of $A_3B_5O_{12}$:Ce having a garnet structure; and a matrix phase having a refractive index higher than a refractive index of the phosphor phase, in which a content of the phosphor phase is 56 vol % or more and 70 vol % or less in terms of a volume ratio with respect to a total including the matrix phase and the phosphor phase.

A is at least one selected from the group consisting of Lu, Gd, Tb, Ga, and Y, and B is Al.

According to the phosphor having such configuration, an amount of extracted fluorescence can be increased by balancing the thermal conductivity and the quantum yield. Since the phosphor includes a matrix phase made of AlN having a high thermal conductivity, it is possible to prevent a decrease in fluorescence conversion efficiency due to a temperature rise by efficiently releasing heat accompanying fluorescence emission. Therefore, the phosphor having such a configuration can efficiently generate bright fluorescence.

Appendix 2

In the phosphor according to appendix 1,

A is Y.

According to such a configuration, it is possible to implement a phosphor that efficiently generates bright fluorescence including a phosphor phase made of YAG ($Y_3Al_5O_{12}$):Ce.

Appendix 3

In the phosphor according to appendix 1 or 2, the matrix phase is AlN.

According to such a configuration, since the phosphor includes a matrix phase made of AlN having a high thermal conductivity, it is possible to prevent a decrease in fluorescence conversion efficiency due to a temperature rise by efficiently heat releasing accompanying fluorescence emission.

Appendix 4

In the phosphor according to any one of appendixes 1 to 3, an average particle diameter of the phosphor phase is 3 μm or more.

According to such a configuration, the excitation light is favorably absorbed in the phosphor phase, so that the emission efficiency of the fluorescence can be enhanced.

Appendix 5

A wavelength conversion device including:

a substrate;

the phosphor according to any one of appendixes 1 to 4 provided on the substrate and configured to convert an incident excitation light into fluorescence; and a reflective layer provided at an opposite side of a light incident side of the phosphor.

According to the wavelength conversion device having such a configuration, it is possible to provide a reflective wavelength conversion device that efficiently extracts bright fluorescence.

Appendix 6

A wavelength conversion device including:

a substrate;

the phosphor according to any one of appendixes 1 to 4 provided on the substrate and configured to convert an incident excitation light into fluorescence; and an optical layer provided on a light incident side of the phosphor and configured to transmit the excitation light and reflect the fluorescence.

According to the wavelength conversion device having such a configuration, it is possible to provide a transmissive wavelength conversion device that efficiently extracts bright fluorescence.

Appendix 7

An illumination device including:

a light source configured to emit the excitation light; and the wavelength conversion device according to appendix 5 or 6, on which the excitation light is incident.

According to the illumination device having such a configuration, it is possible to provide an illumination device that has excellent wavelength conversion efficiency and emits a bright illumination light.

Appendix 8

A projector including:

the illumination device according to appendix 7;

a light modulation device configured to modulate a light emitted from the illumination device; and a projection optical device configured to project the light modulated by the light modulation device.

According to the projector having such a configuration, it is possible to provide a projector having excellent display quality and high efficiency.

EXAMPLES

Hereinafter, the present disclosure will be described in more detail with reference to Examples, and the present disclosure is not limited to Examples.

Example 1

First, a YAG powder in which a content of the phosphor phase was 56 vol % in a volume ratio to an entire phase including the matrix phase and the phosphor phase was kneaded with an AlN powder having AlN as the matrix phase 521, and the kneaded product was subjected to uniaxial molding to have a diameter of 20 mm and fired at 1800° C. in a nitrogen atmosphere. Thereafter, polishing was performed to produce a phosphor in Example 1 having a thickness of 200 μm.

Example 2

A phosphor in Example 2 was produced by carrying out the steps same as in Example 1 except that a powder in which the content of the phosphor phase was 60 vol % was used as the YAG powder.

Example 3

A phosphor in Example 3 was produced by carrying out the steps same as in Example 1 except that a powder in which the content of the phosphor phase was 70 vol % was used as the YAG powder.

Comparative Example 1

A phosphor in Comparative Example 1 was produced by carrying out the steps same as in Example 1 except that a powder in which the content of the phosphor phase was 10 vol % was used as the YAG powder.

Comparative Example 2

A phosphor in Comparative Example 2 was produced by carrying out the steps same as in Example 1 except that a powder in which the content of the phosphor phase was 20 vol % was used as the YAG powder.

Comparative Example 3

A phosphor in Comparative Example 3 was produced by carrying out the steps same as in Example 1 except that a powder in which the content of the phosphor phase was 40 vol % was used as the YAG powder.

Comparative Example 4

A phosphor in Comparative Example 4 was produced by carrying out the steps same as in Example 1 except that a powder in which the content of the phosphor phase was 50 vol % was used as the YAG powder.

Comparative Example 5

A phosphor in Comparative Example 5 was produced by carrying out the steps same as in Example 1 except that a powder in which the content of the phosphor phase was 80 vol % was used as the YAG powder.

Comparative Example 6

A phosphor in Comparative Example 6 was produced by carrying out the steps same as in Example 1 except that a powder in which the content of the phosphor phase was 100 vol % was used as the YAG powder.

Evaluation of Examples and Comparative Examples

In each of Examples and Comparative Examples described above, the average particle diameter (unit: μm) of YAG, the quantum yield (unit: %), and the thermal conductivity (unit: W/m·K) were checked as described below, and a phosphor having a high quantum yield and a high thermal conductivity was determined as a phosphor having high light utilization efficiency. Determination results are shown in Table 1.

In Table 1, samples with a quantum yield of 85% or more were evaluated as A (acceptable), and samples with a quantum yield of less than 85% were evaluated as B (unacceptable). In addition, in Table 1, samples with a thermal conductivity of 20% or more were evaluated as A (acceptable), and samples with a thermal conductivity of less than 20% were evaluated as B (unacceptable).

Further, as an overall evaluation, samples whose evaluation items of the quantum yield and the thermal conductivity were both A were rated A (acceptable), and samples whose evaluation items of the quantum yield and the thermal conductivity were both B were rated B (unacceptable). In Table 1, a volume ratio of the phosphor phase to the entire phase including the matrix phase and the phosphor phase was defined as the YAG amount.

TABLE 1

| | Matrix phase | YAG amount (vol %) | YAG average particle diameter (μm) | Internal quantum yield (%) | Thermal conductivity (W/m · K) | Evaluation of quantum yield | Evaluation of thermal conductivity | Determination |
|---|---|---|---|---|---|---|---|---|
| Comparative Example 1 | AIN | 10 | 2.3 | 55 | 80.0 | B | A | B |
| Comparative Example 2 | AIN | 20 | 5.8 | 79 | 73.5 | B | A | B |
| Comparative Example 3 | AIN | 40 | 6.9 | 80 | 61.2 | B | A | B |
| Comparative Example 4 | AIN | 50 | 9.8 | 83 | 46.0 | B | A | B |

TABLE 1-continued

| | Matrix phase | YAG amount (vol %) | YAG average particle diameter (μm) | Internal quantum yield (%) | Thermal conductivity (W/m · K) | Evaluation of quantum yield | Evaluation of thermal conductivity | Determination |
|---|---|---|---|---|---|---|---|---|
| Example 1 | AlN | 56 | 10.8 | 89 | 41.4 | A | A | A |
| Example 2 | AlN | 60 | 12.6 | 90 | 33.0 | A | A | A |
| Example 3 | AlN | 70 | 20.7 | 90 | 23.0 | A | A | A |
| Comparative Example 5 | AlN | 80 | 37.8 | 92 | 15.0 | A | B | B |
| Comparative Example 6 | AlN | 100 | 50.4 | 94 | 9.0 | A | B | B |

A . . . 85 or more
A . . . 20 or more
A: acceptable
B . . . less than 85
B . . . less than 20
B: unacceptable As shown in Table 1, in the case of Comparative Example 1 (YAG amount: 10%), although a sufficient value of the thermal conductivity of 80.0 can be obtained by increasing a ratio of the matrix phase, the excitation light is not absorbed by the phosphor phase due to a decrease in the ratio of the phosphor phase, and the quantum yield decreases to 55%. In addition, in the case of Comparative Example 2 (YAG amount: 20%), Comparative Example 3 (YAG amount: 40%), and Comparative Example 4 (YAG amount: 50%), although sufficient values of the thermal conductivity of 73.5, 61.2, and 46.0 can be obtained, the quantum yields are 79%, 80%, and 83%, and thus the fluorescence conversion efficiency is not sufficient.

On the other hand, in the case of Example 1 (YAG amount: 56%), it is confirmed that the thermal conductivity is 41.4 and the quantum yield is 89, and both the thermal conductivity and the quantum yield are high. In addition, in the case of Example 2 (YAG amount: 60%), it is confirmed that the thermal conductivity is 33.0 and the quantum yield is 90, and both the thermal conductivity and the quantum yield are high. In addition, in the case of Example 3 (YAG amount: 70%), it is confirmed that the thermal conductivity is 23.0 and the quantum yield is 90, and both the thermal conductivity and the quantum yield are high.

On the other hand, in the case of Comparative Example 5 (YAG amount: 80%), it is confirmed that, although the quantum yield is highest at 92, the thermal conductivity is decreased to 15.0. In addition, in the case of Comparative Example 6 (YAG amount: 100%), it is confirmed that, although the quantum yield is highest at 94, the thermal conductivity is decreased to 9.0. That is, in the case of Comparative Examples 5 and 6, it is confirmed that, when the temperature increases during fluorescence emission, a shift amount of an emission spectrum to a long wavelength side increases, and the emission efficiency of fluorescence significantly decreases.

Based on the above results, according to the phosphors in Examples 1 to 5, it is confirmed that it is possible to generate bright fluorescence by enhancing the emission efficiency of the fluorescence by enhancing the thermal conductivity and the quantum yield in a balanced manner by setting the YAG amount to 56% or more and 70% or less.

What is claimed is:

1. A phosphor comprising:

a phosphor phase made of $A_3B_5O_{12}$:Ce having a garnet structure; and a matrix phase having a refractive index higher than a refractive index of the phosphor phase, wherein a content of the phosphor phase is 56 vol % or more and 70 vol % or less in terms of a volume ratio with respect to a total including the matrix phase and the phosphor phase, a content of the matrix phase is 33 vol % or more and 44 vol % or less in terms of the volume ratio with respect to a total including the matrix phase and the phosphor phase; and A is at least one selected from the group consisting of Lu, Gd, Tb, Ga, and Y, and B is Al.

2. The phosphor according to claim 1, wherein

A is Y.

3. The phosphor according to claim 1, wherein the matrix phase is AlN.

4. The phosphor according to claim 1, wherein an average particle diameter of the phosphor phase is 3 μm or more.

5. A wavelength conversion device comprising:

a substrate;

the phosphor according to claim 1 provided on the substrate and configured to convert an incident excitation light into fluorescence; and a reflective layer provided at an opposite side of a light incident side of the phosphor.

6. A wavelength conversion device comprising:

a substrate;

the phosphor according to claim 1 provided on the substrate and configured to convert an incident excitation light into fluorescence; and an optical layer provided on a light incident side of the phosphor and configured to transmit the excitation light and reflect the fluorescence.

7. An illumination device comprising:

a light source configured to emit the excitation light; and the wavelength conversion device according to claim 5, on which the excitation light is incident.

8. An illumination device comprising:

a light source configured to emit the excitation light; and the wavelength conversion device according to claim 6, on which the excitation light is incident.

9. A projector comprising:

the illumination device according to claim 7;

a light modulation device configured to modulate a light emitted from the illumination device; and a projection optical device configured to project the light modulated by the light modulation device.

10. A projector comprising:

the illumination device according to claim 8;

a light modulation device configured to modulate a light emitted from the illumination device; and a projection optical device configured to project the light modulated by the light modulation device.

11. The phosphor according to claim 1, wherein A is Gd.

12. The phosphor according to claim 1, wherein the phosphor has a quantum yield of 85% or more.

13. The phosphor according to claim 1, wherein a thermal conductivity of the phosphor is 20 W/m*k or more.

* * * * *